United States Patent
Kanazawa

(10) Patent No.: US 12,353,774 B2
(45) Date of Patent: Jul. 8, 2025

(54) INFORMATION PROCESSING APPARATUS, NON-TRANSITORY COMPUTER READABLE MEDIUM STORING PROGRAM, AND INFORMATION PROCESSING METHOD

(71) Applicant: FUJIFILM CORPORATION, Tokyo (JP)

(72) Inventor: Yuki Kanazawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 263 days.

(21) Appl. No.: 18/048,866

(22) Filed: Oct. 24, 2022

(65) Prior Publication Data

US 2023/0244419 A1    Aug. 3, 2023

(30) Foreign Application Priority Data

Feb. 2, 2022    (JP) ................................ 2022-015013

(51) Int. Cl.
G06F 3/12      (2006.01)
(52) U.S. Cl.
CPC .......... *G06F 3/1205* (2013.01); *G06F 3/1237* (2013.01); *G06F 3/1279* (2013.01)

(58) Field of Classification Search
CPC .... G06F 3/1205; G06F 3/1237; G06F 3/1279; G06F 3/1222; G06F 3/1238; G06F 3/1285
See application file for complete search history.

(56) References Cited

U.S. PATENT DOCUMENTS

| | | |
|---|---|---|
| 2019/0095161 A1 | 3/2019 | Hamamoto |
| 2020/0012469 A1 | 1/2020 | Hamamoto |
| 2020/0304685 A1 | 9/2020 | Inoue |
| 2021/0136252 A1* | 5/2021 | Fukuda ............... H04N 1/32106 |
| 2023/0112103 A1* | 4/2023 | Ido ....................... H04N 1/0048 |
| | | 358/1.15 |

FOREIGN PATENT DOCUMENTS

| | | | |
|---|---|---|---|
| JP | 2019-059136 A | | 4/2019 |
| JP | 2020-154819 A | | 9/2020 |

* cited by examiner

*Primary Examiner* — John R Wallace
(74) *Attorney, Agent, or Firm* — SOLARIS Intellectual Property Group, PLLC

(57) ABSTRACT

An information processing apparatus includes a processor configured to, in a case where an executed processing content satisfies a preset condition, register setting information in which a setting value in the processing content is stored for each setting item, as shared setting information usable by plural users.

15 Claims, 18 Drawing Sheets

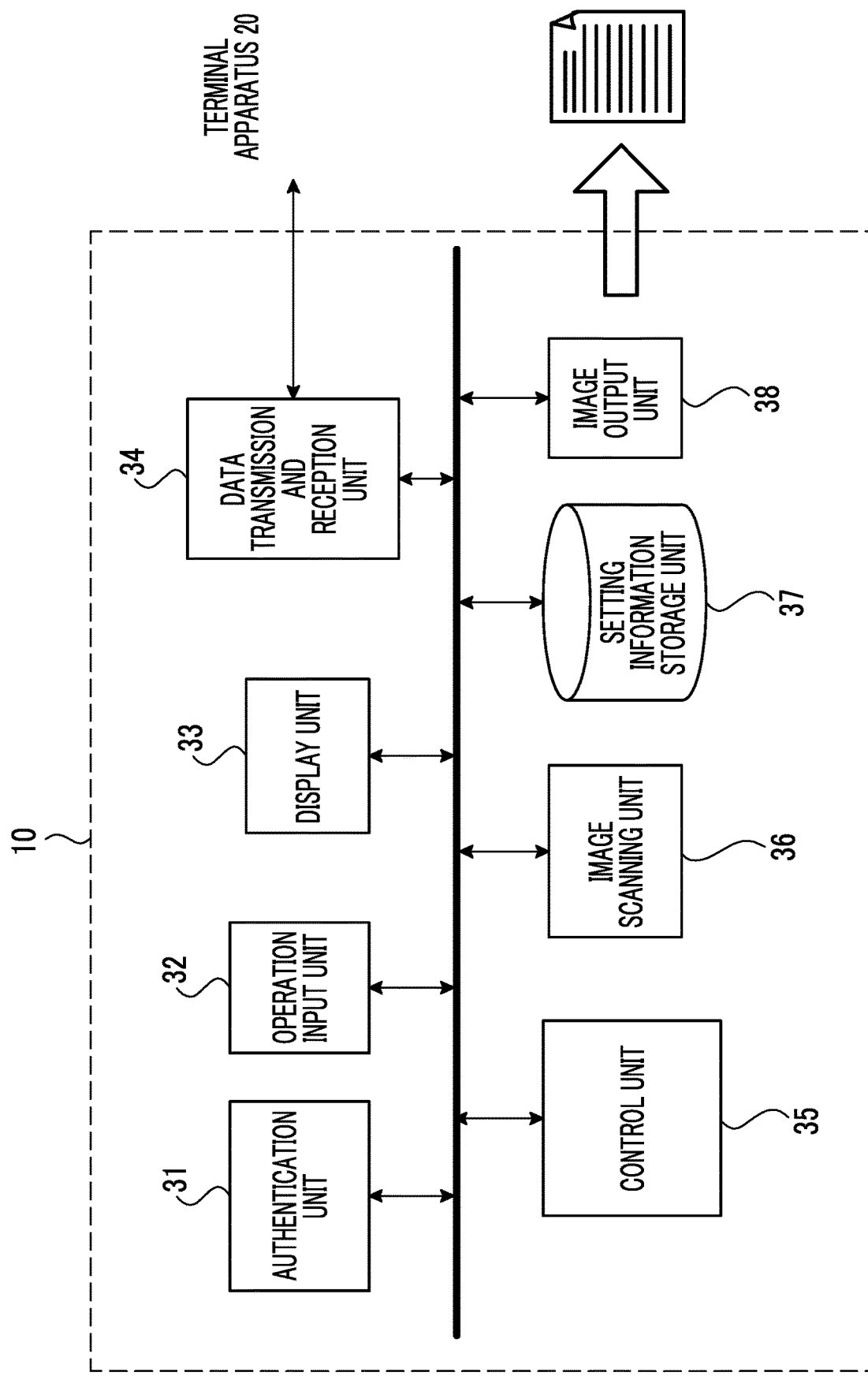

FIG. 4

EXAMPLE OF PERSONAL SETTING INFORMATION MANAGEMENT TABLE (USER A)

| NAME | JOB TYPE | SETTING CONTENT | DATE AND TIME OF LAST USE | PINNED |
|---|---|---|---|---|
| GENERAL AFFAIRS DEPARTMENT | FAX | DESTINATION: 03-1111-1111 IMAGE QUALITY: NORMAL | - | O |
| FAX TO TRAVEL COMPANY | FAX | DESTINATION: 045-123-4567 IMAGE QUALITY: PHOTO ORIGINAL DOCUMENT | - | O |
| user3@sample.com | SCANNING TRANSMISSION | ADDRESS: user3@sample.com | 8/24/2021 16:03 | |
| COPYING | COPYING | NUMBER OF COPIES 1 COPY BLACK AND WHITE, ONE-SIDED 100% PAPER SHEET: A4 | 8/24/2021 15:58 | |
| SCANNING TO USER A | SCANNING | ADDRESS: zzz@abcd.co.jp | 8/24/2021 10:23 | |
| APPLICATION SCANNING | SCANNING | ADDRESS: aaa@bbb.cc.com | 8/24/2021 9:22 | |
| ..... | ..... | ..... | ..... | |

{ First two rows: IN PINNED STATE }
{ Remaining rows: JOB HISTORY INFORMATION }

FIG. 5

EXAMPLE OF SHARED SETTING INFORMATION MANAGEMENT TABLE

| NAME | JOB TYPE | SETTING CONTENT |
|---|---|---|
| RECOMMENDED COPYING SETTING | COPYING | NUMBER OF COPIES: 1 COPY MAGNIFICATION: 100% COLOR SETTING: BLACK AND WHITE, PAPER SHEET: A4, TWO-SIDED |
| SUPPORT CENTER | SCANNING TRANSMISSION | DESTINATION: 03-2222-2222 IMAGE QUALITY: NORMAL |
| FAX TO TRAVEL COMPANY | FAX | DESTINATION: 045-123-4567 IMAGE QUALITY: PHOTO ORIGINAL DOCUMENT |

EXAMPLE OF WHITELIST

| DESTINATION | FAX NUMBER |
|---|---|
| GENERAL AFFAIRS DEPARTMENT | 03-1234-5678 |
| HUMAN RESOURCES DEPARTMENT | 03-1111-3333 |
| SALES DEPARTMENT SALES TEAM 2 | 045-123-4567 |
| SALES DEPARTMENT SALES TEAM 1 | 045-321-7654 |
| ACCOUNTING DEPARTMENT | 03-2222-4444 |
| ……. | ……. |

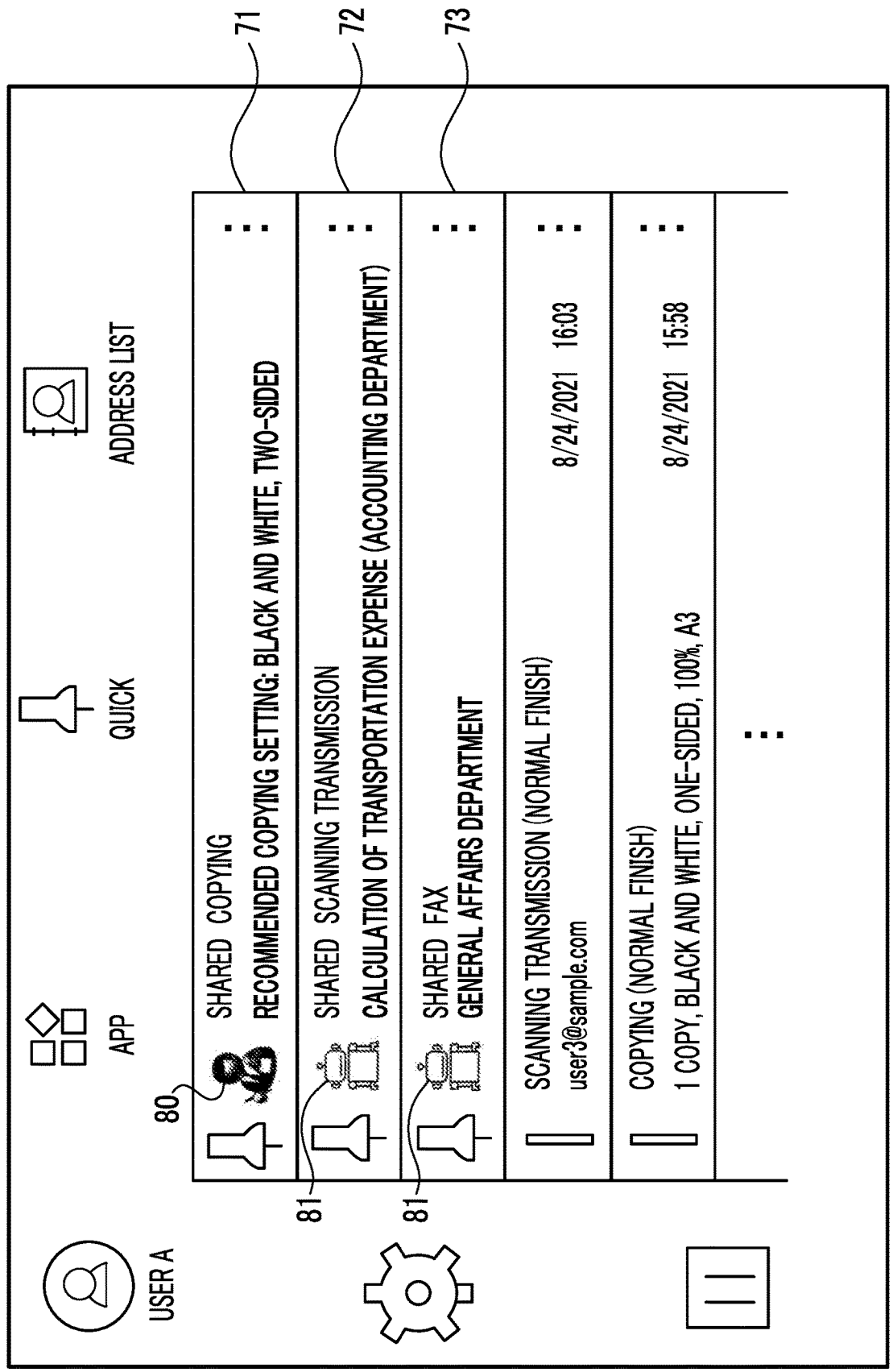

INFORMATION PROCESSING APPARATUS, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2022-015013, filed on Feb. 2, 2022, the entire disclosure of which is incorporated by reference herein.

BACKGROUND

(i) Technical Field

The present invention relates to an information processing apparatus, a non-transitory computer readable medium storing a program, and an information processing method.

(ii) Related Art

JP2019-059136A discloses an image forming apparatus that stores a job parameter shared in a group including a plurality of image forming apparatuses and, in a case where the job parameter cannot be executed with ability of the image forming apparatus, corrects the job parameter to a job parameter executable with the ability of the image forming apparatus so that the registered job parameter is normally used.

JP2020-154819A discloses an information processing apparatus that, in generating an execution result of a job as history information, conceals the entirety or a part of the history information in accordance with authorization of a viewer and presents the concealed history information so that information to be concealed in the history information of the job can be presented in a concealed manner in accordance with the authorization of the viewer.

SUMMARY

There is a function of selecting history information of a processing content that is likely to be executed again from history information generated in a case where a process is executed, and storing setting information in which a setting value in the processing content of the history information is stored for each setting item, as shared setting information. Such a function enables the process to be executed by a plurality of users using the same setting information.

However, in the execution of the process by the plurality of users using the same setting information, a user such as a manager user needs to select any history information from a large amount of history information and register the selected history information as the shared setting information by performing an operation. However, the selection and the registration as the shared setting information by performing the operation burdens the user. On the other hand, in a case where the setting information of the executed process is automatically registered as the shared setting information without any condition, non-shared setting information cannot be controlled.

Aspects of non-limiting embodiments of the present disclosure relate to an information processing apparatus, a non-transitory computer readable medium storing a program, and an information processing method that can control non-shared setting information while reducing a burden of a user, compared to a case where history information selected from generated history information is registered by an operation of the user as shared setting information usable by a plurality of users.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to, in a case where an executed processing content satisfies a preset condition, register setting information in which a setting value in the processing content is stored for each setting item, as shared setting information usable by a plurality of users.

BRIEF DESCRIPTION OF THE DRAWINGS

Exemplary embodiment(s) of the present invention will be described in detail based on the following figures, wherein:

FIG. 3 is a block diagram illustrating a functional configuration of the image forming apparatus 10 in the exemplary embodiment of the present invention;

FIG. 4 is a diagram illustrating an example of a personal setting information management table stored in a setting information storage unit 37;

FIG. 5 is a diagram illustrating an example of a shared setting information management table stored in the setting information storage unit 37;

FIG. 14 is a diagram illustrating a scanned original document image example;

FIG. 15 is a diagram illustrating an example of a whitelist;

FIG. 18 is a diagram illustrating a display screen example after the shared setting information is registered.

DETAILED DESCRIPTION

Next, an exemplary embodiment of the present invention will be described in detail with reference to the drawings.

Figure 1:
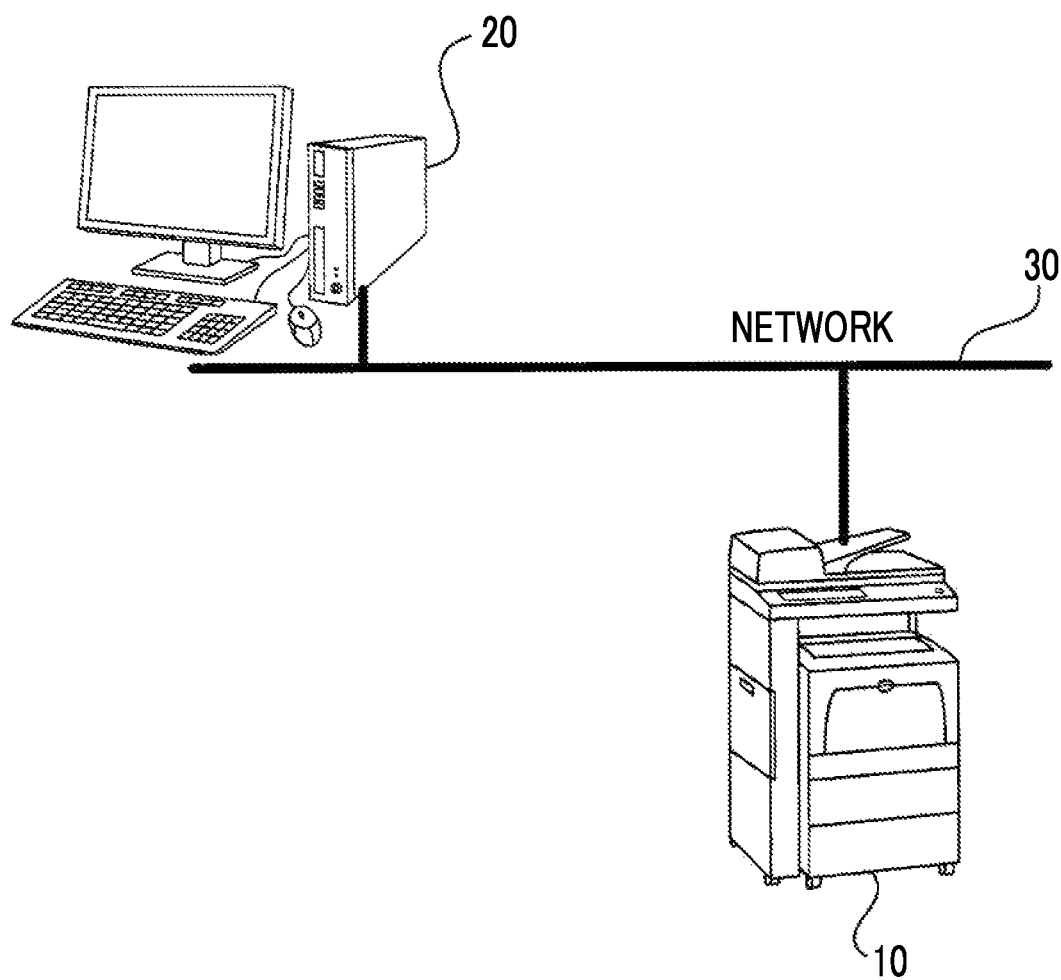
FIG. 1 is a diagram illustrating a system configuration of an image forming system of an exemplary embodiment of the present invention.

FIG. 1 is a diagram illustrating a system configuration of an image forming system of the exemplary embodiment of the present invention.

As illustrated in FIG. 1, the image forming system of the exemplary embodiment of the present invention is configured with an image forming apparatus 10 and a terminal apparatus 20 connected to each other via a network 30. The terminal apparatus 20 generates printing data and transmits the generated printing data to the image forming apparatus 10 via the network 30. The image forming apparatus 10 receives the printing data transmitted from the terminal apparatus 20 and outputs an image corresponding to the printing data on a paper sheet. The image forming apparatus 10 is an apparatus referred to as a so-called multifunction peripheral having a plurality of functions such as a printing function, a scanning function, a copying function, and a facsimile function.

Figure 2:
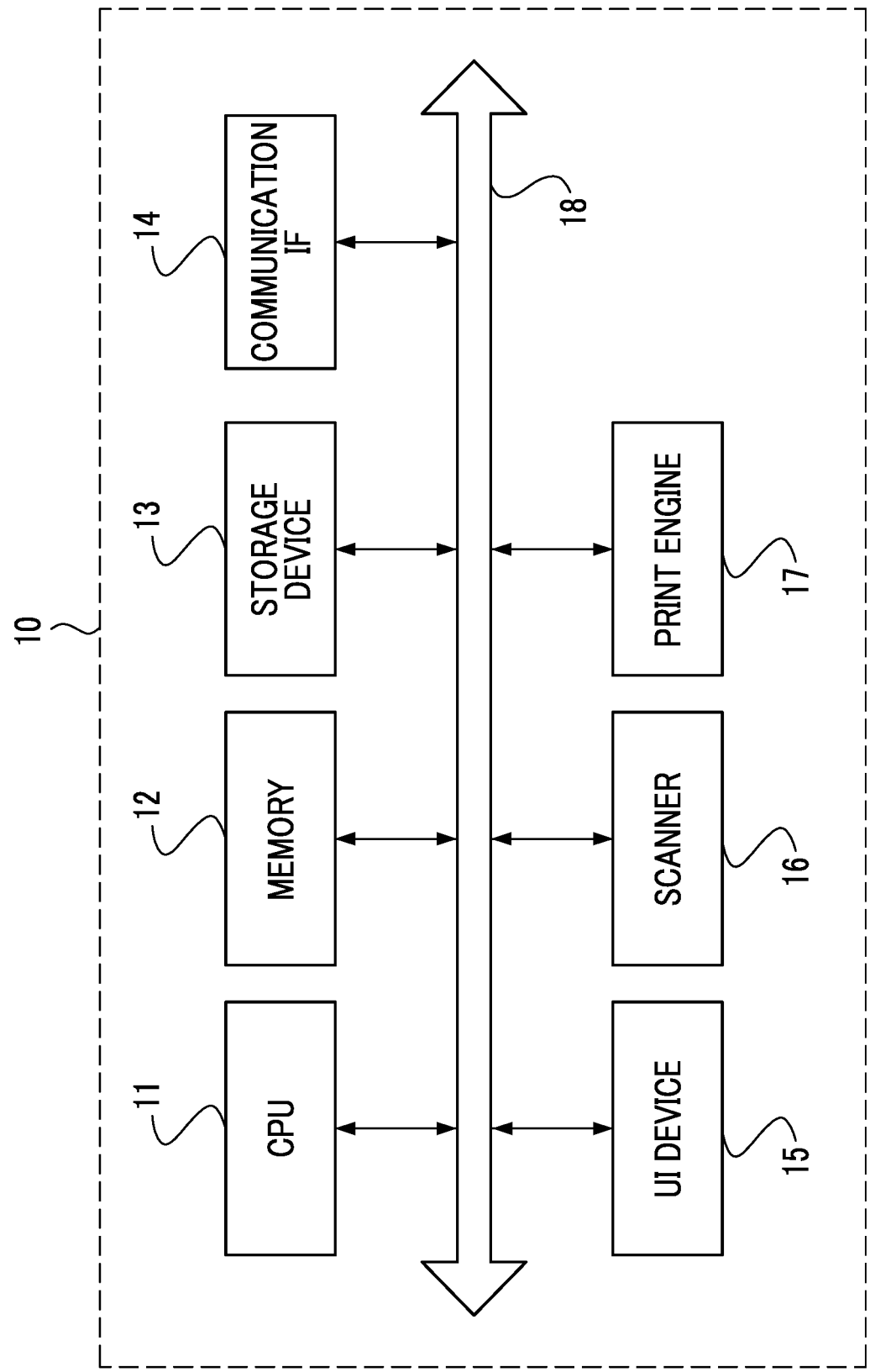
FIG. 2 is a block diagram illustrating a hardware configuration of an image forming apparatus 10 in the exemplary embodiment of the present invention.

Next, a hardware configuration of the image forming apparatus 10 in the image forming system of the present exemplary embodiment is illustrated in FIG. 2.

As illustrated in FIG. 2, the image forming apparatus 10 includes a CPU 11, a memory 12, a storage device 13 such as a hard disk drive, a communication interface (abbreviated to IF) 14 that transmits and receives data to and from an external apparatus or the like via the network 30, a user interface (abbreviated to UI) device 15 that includes a touch panel or a liquid crystal display and a keyboard, a scanner 16, and a print engine 17. These constituents are connected to each other via a control bus 18.

The print engine 17 prints an image on a recording medium such as a printing paper sheet through steps of electrostatic charging, exposure, development, transfer, fixing, and the like.

The CPU 11 is a processor that controls an operation of the image forming apparatus 10 by executing a predetermined process based on a control program stored in the memory 12 or the storage device 13. In the present exemplary embodiment, while the CPU 11 is described as reading and executing the control program stored in the memory 12 or the storage device 13, the present invention is not limited thereto. The control program may be provided in the form of a recording on a computer readable recording medium. For example, this program may be provided in the form of a recording on an optical disc such as a compact disc (CD)-ROM and a digital versatile disc (DVD)-ROM or in the form of a recording on a semiconductor memory such as a universal serial bus (USB) memory and a memory card. In addition, the control program may be acquired from an external apparatus via a communication line connected to the communication interface 14.

FIG. 3 is a block diagram illustrating a functional configuration of the image forming apparatus 10 implemented by executing the control program.

As illustrated in FIG. 3, the image forming apparatus 10 of the present exemplary embodiment includes an authentication unit 31, an operation input unit 32, a display unit 33, a data transmission and reception unit 34, a control unit 35, an image scanning unit 36, a setting information storage unit 37, and an image output unit 38.

The authentication unit 31 executes an authentication process for a user who wants to use the image forming apparatus 10. The display unit 33 is controlled by the control unit 35 and displays various information to the user. The operation input unit 32 inputs information about various operations performed by the user.

The data transmission and reception unit 34 transmits and receives data to and from the external apparatus such as the terminal apparatus 20.

The control unit 35 controls an overall operation of the image forming apparatus 10 and performs a control of generating the printing data based on a printing job received from the terminal apparatus 20 via the data transmission and reception unit 34 and outputting the generated printing data from the image output unit 38, a control of scanning an original document image by the image scanning unit 36, and the like. The setting information storage unit 37 stores job history information indicating an execution history of various jobs such as the printing job, a scanning job, a copying job, and a fax transmission job executed by the control unit 35 and setting information in which a setting value in executing a process is stored for each setting item. Here, the job history information is history information of a processing content of a job executed in the past.

The image output unit 38 outputs the image onto the recording medium such as a printing paper sheet under control of the control unit 35. The image scanning unit 36 scans the original document image from a set original document under control of the control unit 35.

Here, the setting information storage unit 37 stores a personal setting information management table for managing personal setting information that is the setting information in which the setting value in executing the process is stored for each setting item and that is usable by only a specific user, and a shared setting information management table for managing shared setting information usable by a plurality of users.

An example of the personal setting information management table stored in the setting information storage unit 37 is illustrated in FIG. 4.

With reference to FIG. 4, the job history information consisting of a name, a job type, a setting content, and a date and time of last use of each job executed in the past and the personal setting information pinned by an operation of the user in the job history information are managed in the personal setting information management table. In a case where the user wants to execute a job having the same content as the setting content in the job executed in the past, the user can execute the job with the same setting content as the setting content such as the setting values in the job history information by selecting the job history information. Even the job history information is included in the personal setting information usable by only a specific user. That is, the job history information is personal setting information in a non-pinned state. In the following description, the setting information in the pinned state usable by only a specific user will be referred to as the personal setting information, and the setting information in the non-pinned state usable by only a specific user will be referred to as the job history information.

In a case where the job is executed by the user using the image forming apparatus 10, new job history information is generated each time the job is executed. However, a data storage region is limited, and the data storage region may be insufficient for storing all job history information. Thus, for example, an upper limit for leaving the job history information of only the most recent 200 jobs is set, and the job history information exceeding the upper limit is deleted in order of date and time of execution from the oldest.

Therefore, a job history not to be deleted can be set to be pinned so that the job history not to be deleted is not set as a deletion target. The job history set to be pinned is managed as the personal setting information and is left without being deleted even in a case where the number of jobs subsequently executed exceeds the upper limit.

For example, with reference to the personal setting information management table in FIG. 4, setting information of names "general affairs department" and "fax to travel company" that is pinned to be managed separately from normal job history information is perceived. That is, this pinned personal setting information is left regardless of the number of subsequently executed jobs and remains displayed on an operation screen. Thus, in a case where frequently used job history information is registered as the personal setting information by performing a pin operation on the frequently used job history information, the job can be executed with the same setting content using the personal setting information any number of times.

Here, for example, the personal setting information and the job history information illustrated in FIG. 4 are setting information usable by only a specific user such as a user A. However, a plurality of users may want to use such setting information. Thus, the personal setting information can be changed to shared setting information. The shared setting information is usable by all logged-in users.

An example of the shared setting information management table for managing the shared setting information is illustrated in FIG. 5.

With reference to FIG. 5, information such as the name, the job type, and the setting content of each job is managed in the shared setting information management table.

For example, with reference to the shared setting information management table in FIG. 5, shared setting information of a name "recommended copying setting" has a job type "copying", and the setting content of the shared setting information is stored. For example, in the shared setting information "recommended copying setting", a setting value "one copy" is set for a setting item "number of copies", and a setting value "100%" is set for a setting item "magnification".

However, in a case where a general user who uses the apparatus is allowed to freely register the personal setting information as the shared setting information, the shared setting information having the same setting content may be registered by each user, and unnecessary shared setting information may be added. In addition, a large amount of shared setting information may be registered. Thus, perceiving which shared setting information is to be selected may be difficult, and using the image forming apparatus 10 may be difficult.

Thus, in displaying a setting screen including the personal setting information and the shared setting information on the display unit 33, the control unit 35 receives an operation of registering the personal setting information as the shared setting information from only a manager user who has broader authorization than the general user who uses the image forming apparatus 10.

Here, the general user is a user who is permitted to use the apparatus and is not permitted to change setting of the apparatus. In addition, the manager user is a user who is referred to a machine manager and is granted broader authorization than the general user by requiring authentication such as input of a special password. The manager user is a user responsible for managing the apparatus.

That is, in the image forming apparatus 10 of the present exemplary embodiment, the general user can only select the shared setting information and execute the job based on the processing content of the shared setting information.

In the image forming apparatus 10 of the present exemplary embodiment, a function of executing a new job using the setting content in the job executed in the past by selecting the job history information, the personal setting information, and the shared setting information described above is provided as a quick function.

Figure 6:
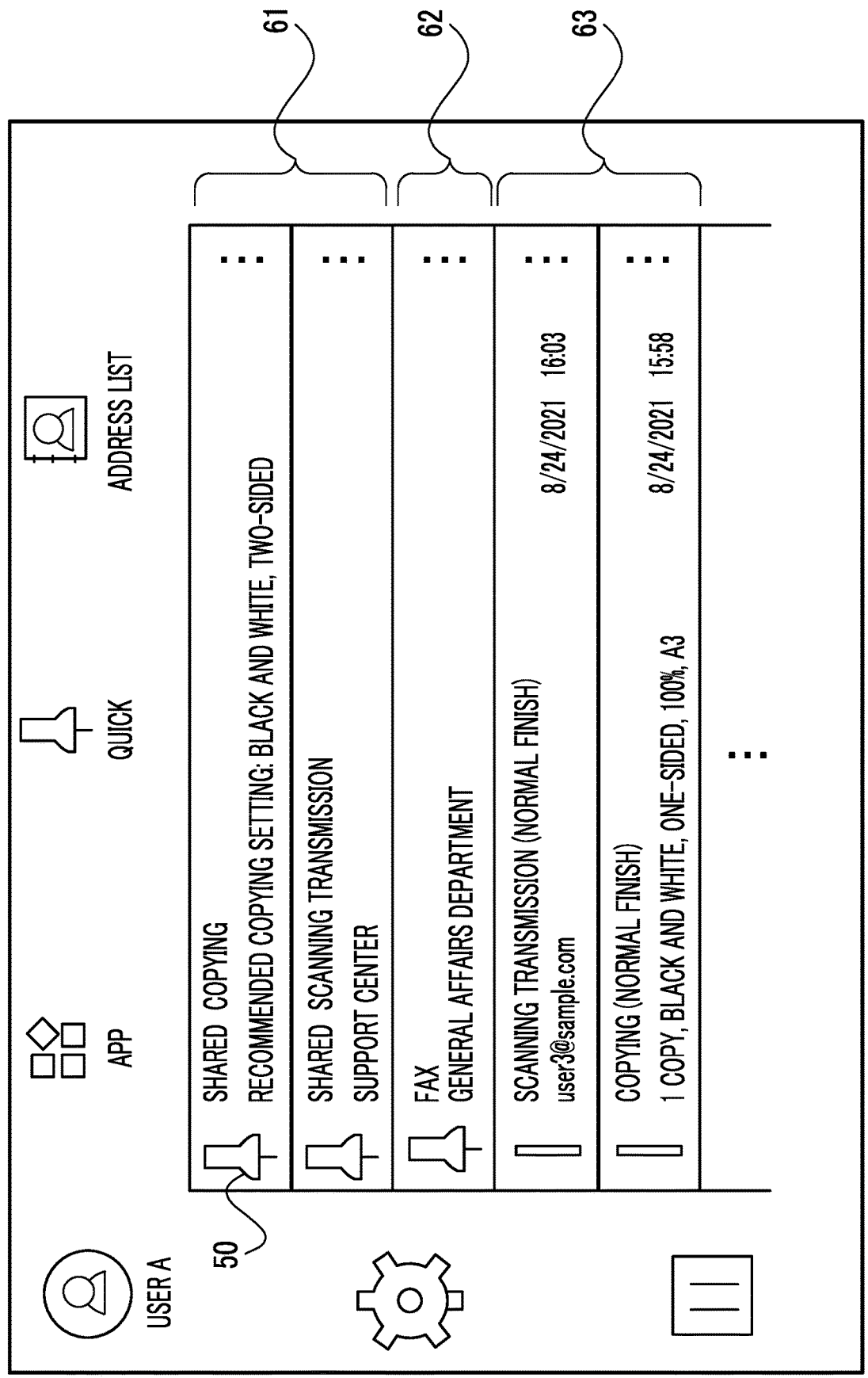
FIG. 6 is a diagram illustrating a display screen example displayed in a case where a user performs a touch operation on an icon for using a quick function.

A display screen example displayed in a case where the user performs a touch operation on an icon for using the quick function is illustrated in FIG. 6.

The control unit 35 generates a display screen as illustrated in FIG. 6 based on the personal setting information management table and the shared setting information management table stored in the setting information storage unit 37 and displays the display screen on an operation panel. In the display screen example illustrated in FIG. 6, display of a list of shared setting information 61, personal setting information 62, and job history information 63 is perceived.

The display screen example of the quick function illustrated in FIG. 6 is a display screen example displayed in a case where the user A logs in in a state where the personal setting information management table illustrated in FIG. 4 and the shared setting information management table illustrated in FIG. 5 are stored in the setting information storage unit 37. Display of a part of the job history displayed on the display screen of the list of the job history is omitted because of a display space.

In the display screen example illustrated in FIG. 6, the shared setting information 61 and the personal setting information 62 are displayed by attaching a pin mark 50 indicating the pinned state to the shared setting information 61 and the personal setting information 62.

As new jobs are executed, the job history information 63 is sequentially deleted in order from the oldest. However, the shared setting information 61 and the personal setting information 62 to which the pin mark 50 is attached are not affected even in a case where new jobs are executed, and remain displayed in the same location without a change in display position.

In a case where the user wants to execute the job having the same content as the job executed in the past, the user can execute the job with an intended setting content without performing detailed setting, by simply selecting the same or similar setting content to the setting content of the job to be executed from the displayed list of the shared setting information 61, the personal setting information 62, and the job history information 63.

For example, the user can execute scanning transmission to the same destination in the same manner as usual without inputting destination information and various setting values, by simply selecting the shared setting information having a name "support center".

Next, an operation in a case where the user performs an operation on the display screen will be described.

Figure 7:
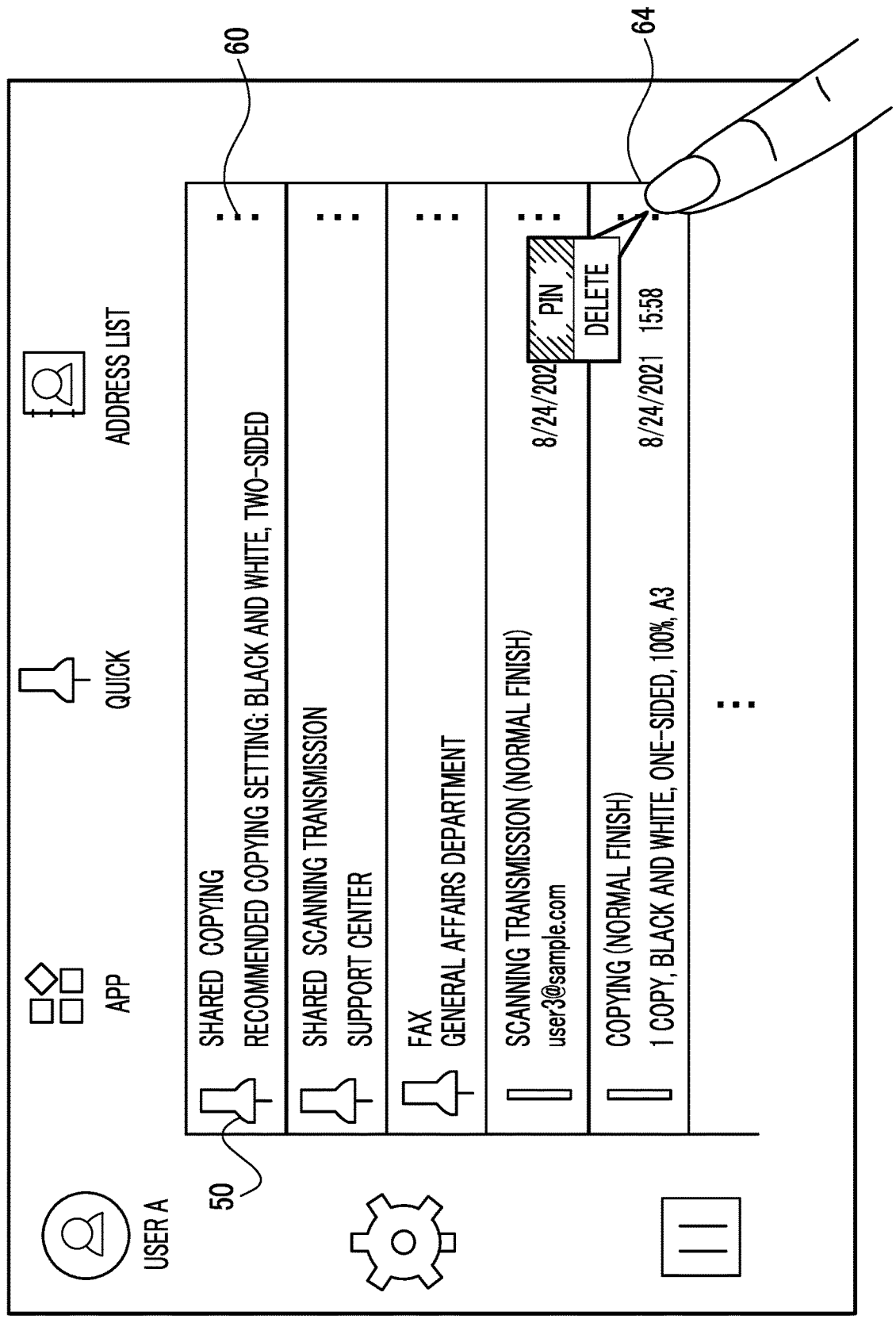
FIG. 7 is a diagram for describing an operation example in a case where a general user registers job history information as personal setting information by pinning the job history information.
Figure 8:
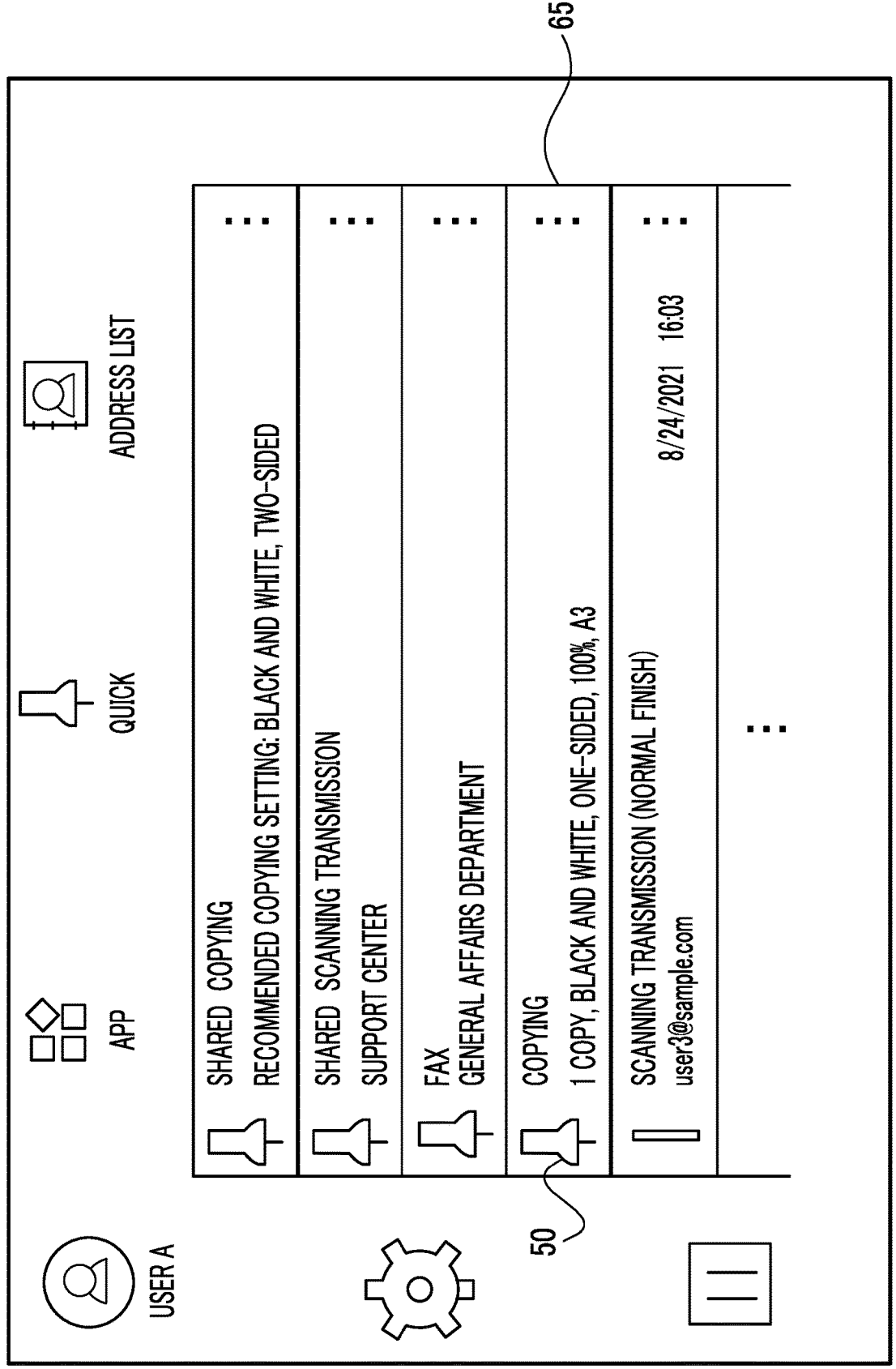
FIG. 8 is a diagram illustrating an operation screen example after job history information 64 is pinned to be changed to personal setting information 65.

First, an operation example in a case where the general user registers the job history information as the personal setting information by pinning the job history information is illustrated in FIG. 7 and FIG. 8.

On the operation screen illustrated in FIG. 7, an operation menu button 60 is displayed at a right end of all of the shared setting information, the personal setting information, and the job history information so that various operations can be executed.

For example, in FIG. 7, an operation menu displayed in a case where the user A who is the general user operates the operation menu button 60 displayed in job history information 64.

On the operation screen in FIG. 7, display of an operation menu consisting of operation items "pin" and "delete" is perceived. In a case where the user selects the operation item "pin" from the operation menu, the job history information 64 is pinned to be changed to the personal setting information.

An operation screen example after the job history information 64 is pinned to be changed to personal setting information 65 is illustrated in FIG. 8.

With reference to FIG. 8, creation of the new personal setting information 65 to which the pin mark 50 is attached by pinning the job history information 64 in FIG. 7 is perceived.

Figure 9:
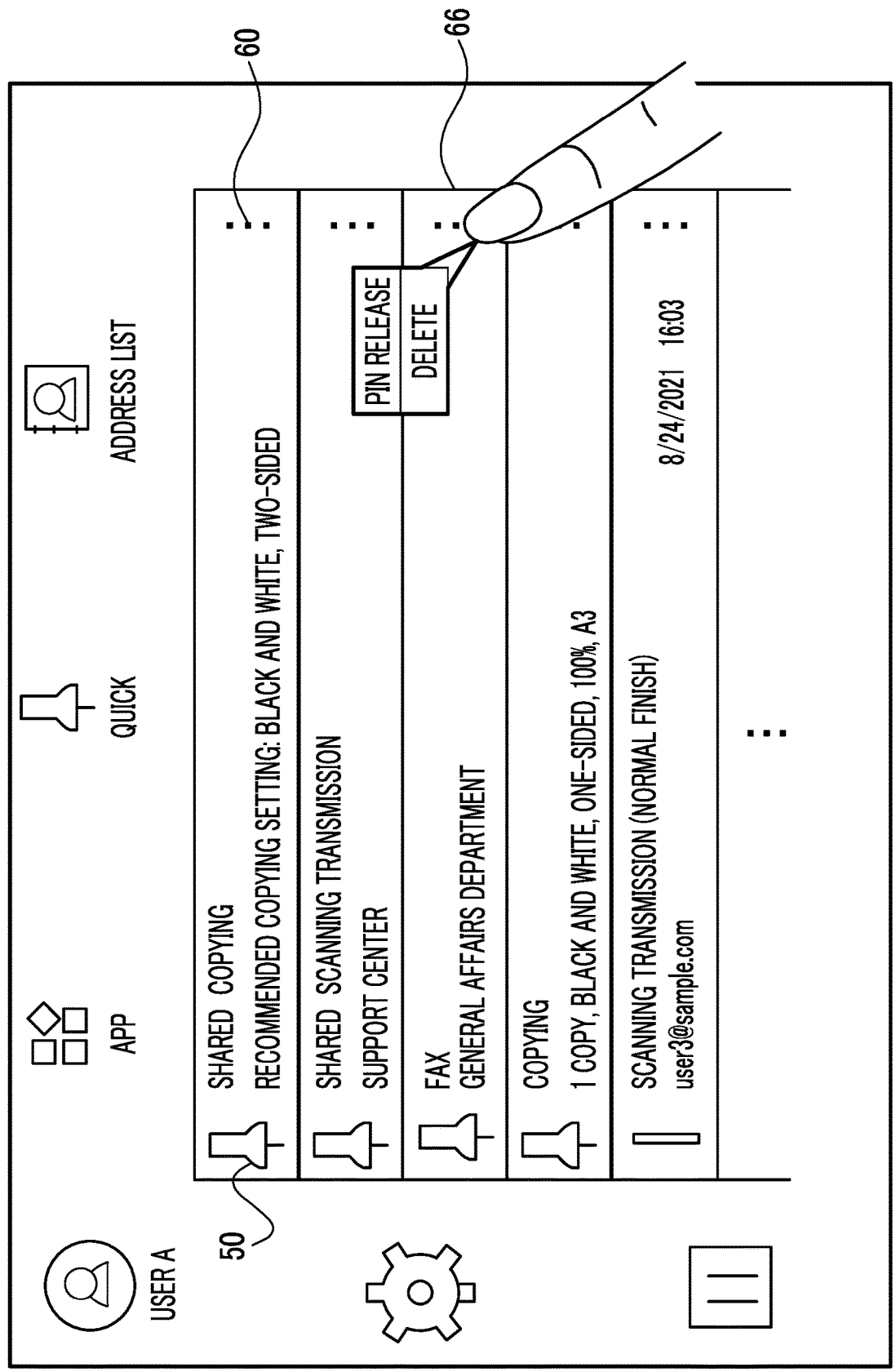
FIG. 9 is a diagram illustrating an operation menu example in a case where a user A operates an operation menu button 60 of personal setting information 66 in a pinned state.

In addition, an operation menu example in a case where the user A operates the operation menu button 60 of personal setting information 66 in the pinned state is illustrated in FIG. 9.

As illustrated in FIG. 9, in a case where the user A operates the operation menu button 60 of the personal setting information that is already in the pinned state, operation items "pin release" and "delete" are displayed in the operation menu. In a case where the user A selects the operation item "pin release" from the operation menu, the personal setting information 66 is released from the pinned state and returns to normal job history information. In addition, in a case where the user A selects the operation item "delete" from the operation menu, the personal setting information 66 is deleted.

Figure 10:
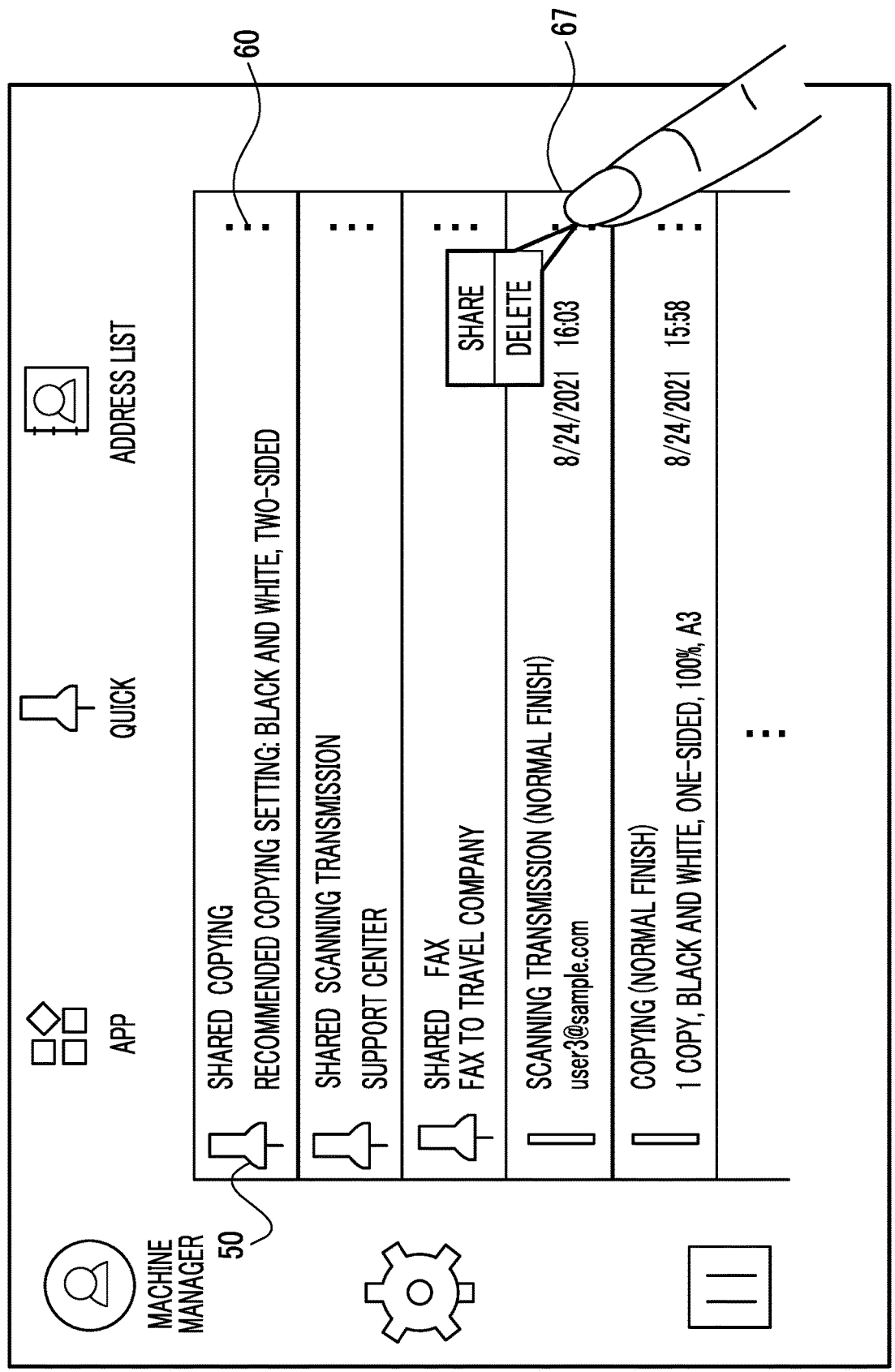
FIG. 10 is a diagram illustrating an operation example in a case where a manager user registers new shared setting information.
Figure 11:
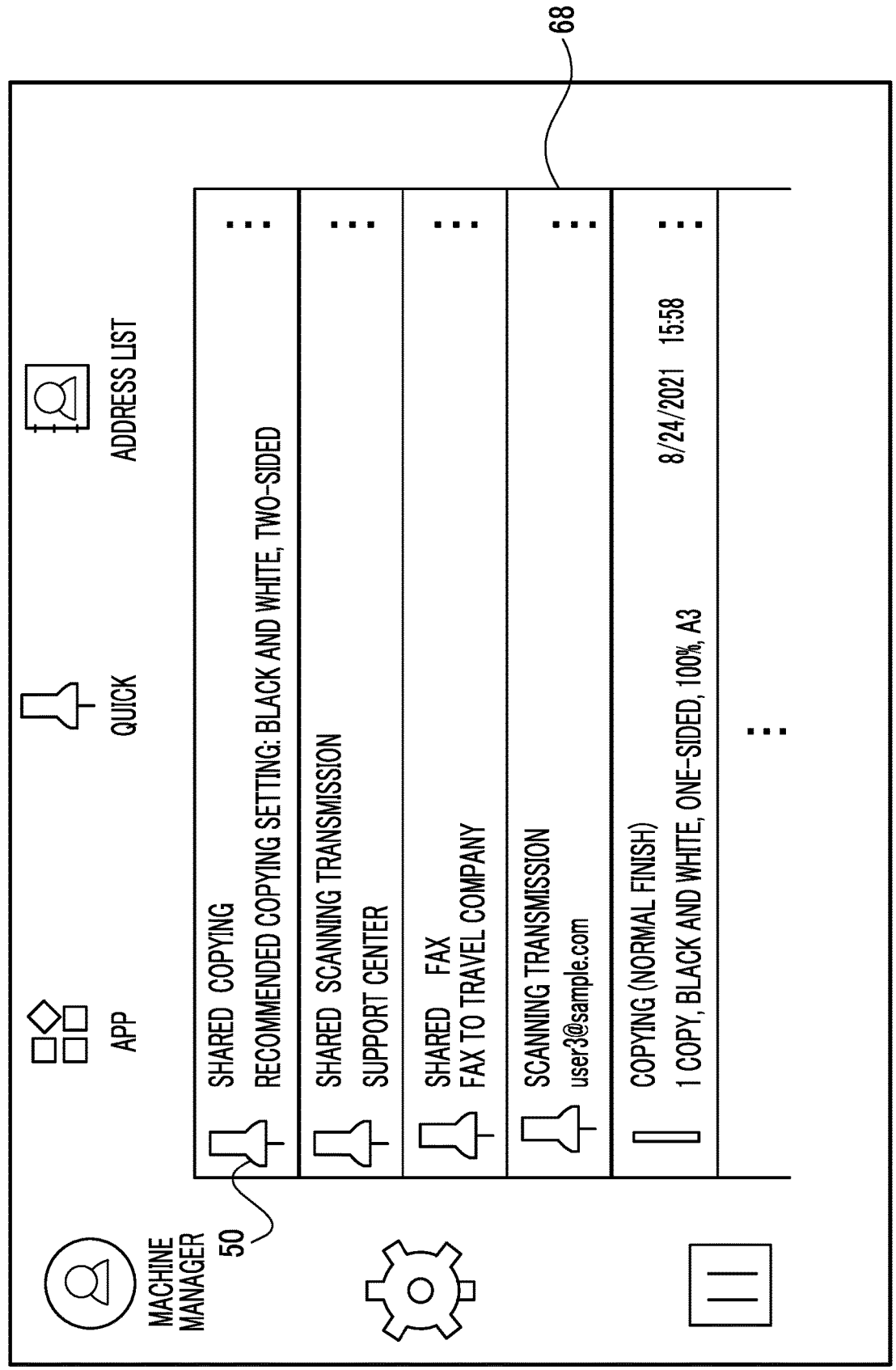
FIG. 11 is a diagram illustrating an operation screen example after job history information 67 is changed to shared setting information 68.

Next, an operation example in a case where the manager user logs in to the image forming apparatus 10 and registers new shared setting information is illustrated in FIG. 10 and FIG. 11.

As illustrated in FIG. 10, in a case where the manager user who is the machine manager operates the operation menu button 60 of the job history information of a name "user3@sample.com" in a state where the manager user has logged in to the image forming apparatus 10, operation items "share" and "delete" are displayed in the operation menu. In a case where the manager user selects the operation item "share" from the operation menu, job history information 67 is registered as the shared setting information.

An operation screen example after the job history information 67 is changed to shared setting information 68 is illustrated in FIG. 11.

With reference to FIG. 11, creation of the new shared setting information 68 to which the pin mark 50 is attached by performing an operation of sharing the job history information 67 in FIG. 10 is perceived.

As described above, the manager user can newly register the shared setting information. The newly registered shared setting information is displayed on the display screen of the quick function of all users. Thus, all users can execute the job with the same setting content.

However, in a case where only the manager user can register the shared setting information, the manager user needs to select any job history information from a large amount of job history information and register the selected job history information as the shared setting information. Thus, in a case of registering the shared setting information, an operation of the manager user is always necessary, and the manager user may be burdened.

Thus, in the image forming apparatus 10 according to the exemplary embodiment of the present invention, the following configuration is provided in order to control non-shared setting information while reducing a burden of the manager user in registering the shared setting information.

Specifically, in a case where the processing content of the executed job satisfies a preset condition, the control unit 35 registers the setting information in which the setting value in the processing content is stored for each setting item, as the shared setting information usable by a plurality of users.

Here, for example, the preset condition is that confidential information is not included in image data to be processed. In addition, for example, not including the confidential information in the image data to be processed is not including personal information from which a person is specifiable in the image data to be processed.

The confidential information is information not to be known to a third party. For example, information such as personal information including a telephone number, an address, an email address, a person name, a credit card number, and the like or classified information corresponds to the confidential information.

In addition, not including the confidential information in the image data to be processed is not including text information indicating that the confidential information is included in the image data to be processed.

Furthermore, the preset condition may be a preset processing condition. For example, the preset processing condition can be that destination information of a personal attribute or storage location information of a personal attribute is not included in the executed processing content. In addition, the preset processing condition is that the destination information of the personal attribute or the storage location information of the personal attribute in the executed processing content is included in a preregistered destination list or storage location list.

Here, for example, the preregistered destination list or storage location list is a list referred to as a so-called whitelist. Here, the whitelist means a list table representing only a destination or a storage location that is considered to not pose a problem even in a case where the destination or the storage location is registered as the shared setting information. Conversely, a list of destination information or storage location information that may pose a problem in a case where the destination information or the storage location information is included in the shared setting information to be registered can be generated as a blacklist so that parameters of a job in which a destination or a storage location included in the blacklist is used is not registered as the shared setting information.

In a case where the processing content of the executed job satisfies the preset condition, the control unit 35 may register the setting information in which the setting value in the processing content is stored for each setting item, as the shared setting information without generating the job history information generated in a case where the process is executed.

In this case, in a case where the processing content of the executed job does not satisfy the preset condition, the control unit 35 generates the job history information.

The control unit 35 can not only automatically register the shared setting information by the execution of the job but also register the shared setting information by selection from the job history information by the manager user who manages the image forming apparatus 10.

Thus, the automatically registered shared setting information coexists with the shared setting information registered by the operation of the manager user. Therefore, the control unit 35 may display the shared setting information registered by the manager user in a distinguished from the shared setting information registered in a case where the executed processing content satisfies the preset condition.

For example, the control unit 35 displays the shared setting information registered by the manager user and the shared setting information automatically registered in a case where the executed processing content satisfies the preset condition in a distinguished manner using colors.

In addition, the control unit 35 may perform the distinguished display by adding a specific text to the name of at least any of the shared setting information registered by the manager user or the shared setting information registered in a case where the executed processing content satisfies the preset condition.

Furthermore, the control unit 35 may collectively display each of the shared setting information registered by the manager user, the shared setting information registered in a case where the executed processing content satisfies the preset condition, and the personal setting information registered by the general user in this order.

The control unit 35 may set the preset condition that the type of executed job is a preset type of process. For example, in a case where the type of executed job is scanning or facsimile transmission, the control unit 35 registers the shared setting information based on the processing content of the executed job. In a case where the type of executed job is printing or copying, the control unit 35 does not register the shared setting information based on the processing content of the executed job even in a case where the processing content of the executed job satisfies the preset condition.

Furthermore, the control unit 35 may set the preset condition that the process is performed by a preset user. For example, in a case where the user A executes the job, the control unit 35 registers the shared setting information based on the processing content of the executed job. In a case where a user B executes the job, the control unit 35 does not register the shared setting information based on the processing content of the executed job. That is, in a case where the user A is highly likely to execute a job that can be effectively used by other users, and the user B only executes a job that is less likely to be used by other users, the preset condition that the process is executed by the user A is registered. Then, the control unit 35 switches whether or not to register as the shared setting information depending on which user has executed the process.

Next, an operation of the image forming apparatus 10 of the present exemplary embodiment will be described in detail with reference to the drawings.

Figure 12:
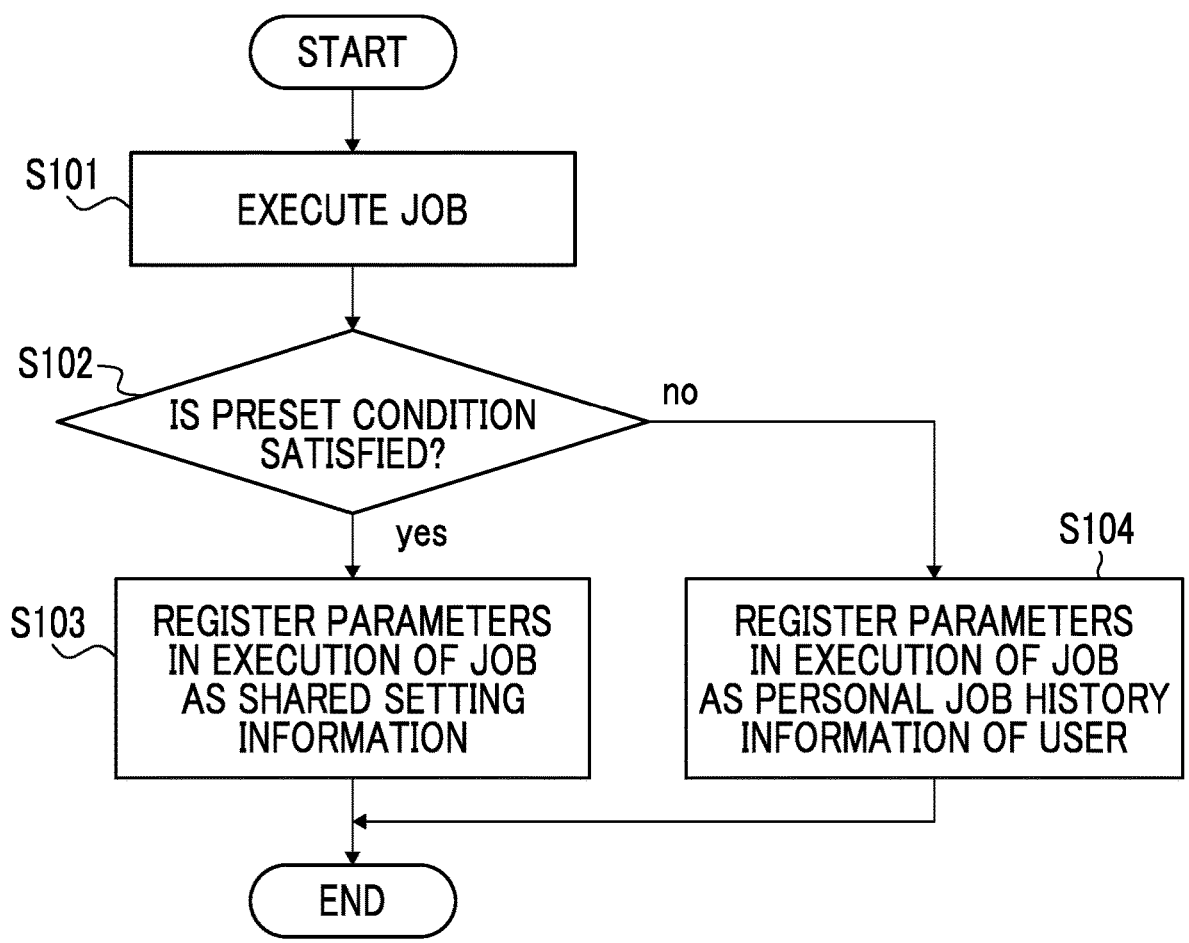
FIG. 12 is a flowchart illustrating a process in which, in a case where a certain job is executed, a control unit 35 determines whether or not to register a processing content of the job as shared setting information.

First, a process in which, in a case where a certain job is executed, a control unit 35 determines whether or not to register the processing content of the job as the shared setting information is illustrated in the flowchart in FIG. 12.

In step S101, in a case where the job is executed, the control unit 35 determines whether or not the processing content of the executed job satisfies the preset condition in step S102.

In step S102, in a case where a determination that the processing content of the executed job satisfies the preset condition is made, the control unit 35 registers the parameters in the execution of the job, that is, the setting values, as the shared setting information in step S103.

In addition, in step S102, in a case where a determination that the processing content of the executed job does not satisfy the preset condition, the control unit 35 registers the parameters in the execution of the job, that is, the setting values, as the personal job history information of the user in step S104.

Figure 13:
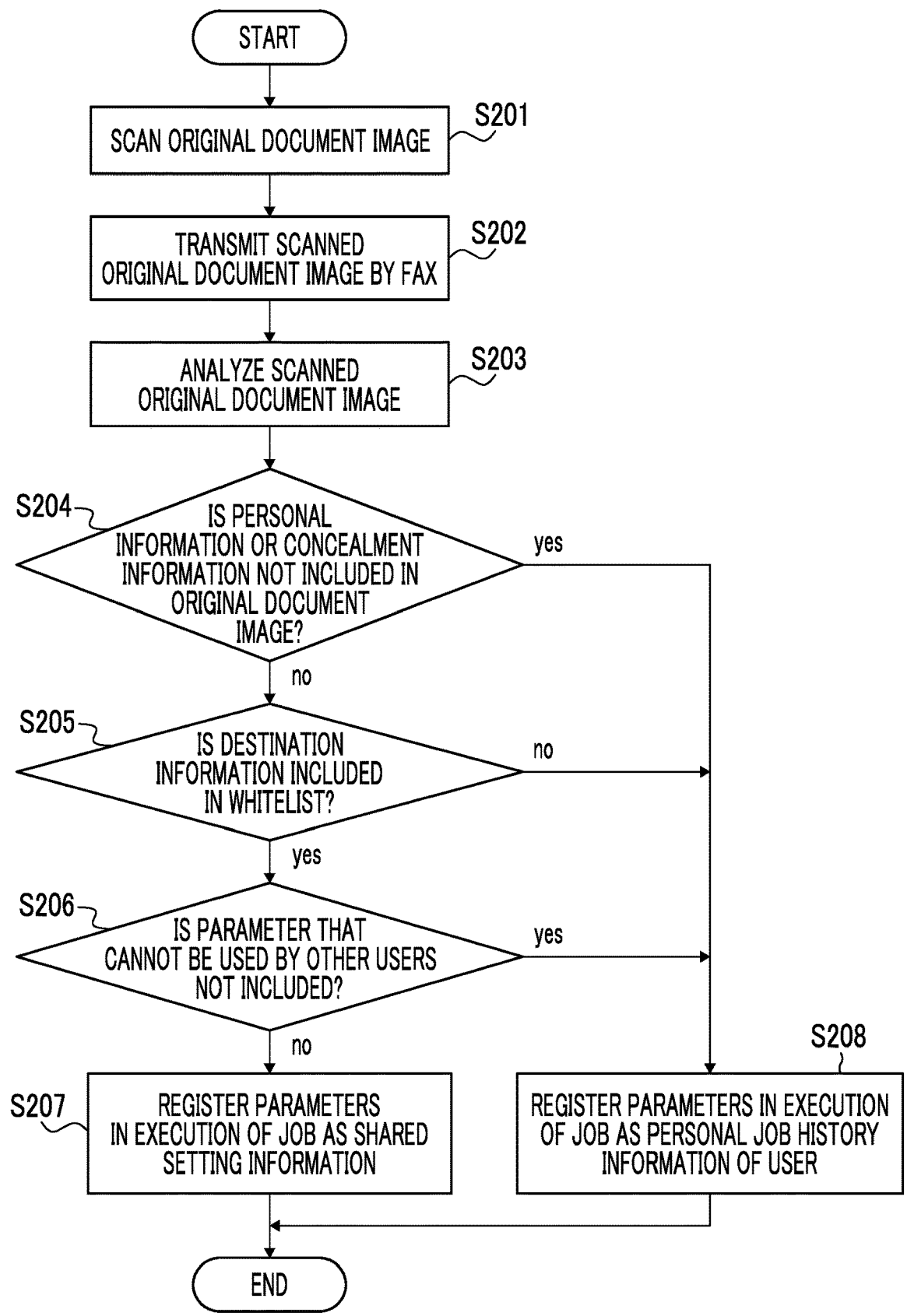
FIG. 13 is a flowchart for describing a determination process in a case of transmitting an original document image by FAX.

Next, such a determination process will be described in further detail using a case where a specific job is executed. FIG. 13 is a flowchart for describing the determination process in a case of transmitting the original document image by facsimile (also referred to as transmitting by FAX).

First, the control unit 35 scans the original document image by controlling the image scanning unit 36 in step S201 and transmits the scanned original document image by facsimile to the designated destination via the data transmission and reception unit 34 in step S202.

Then, in step S203, the control unit 35 analyzes the original document image scanned by an optical character recognition (OCR) process or the like.

Next, in step S204, the control unit 35 determines whether or not personal information or concealment information is included in the original document image. Here, the personal information is information such as a name, a date of birth, an address, a telephone number, and a face photo from which a person is specifiable. In addition, the concealment information is information indicating that the original document image is to be concealed, and means, for example, concealment annotation information such as a text string "company secret" or "confidential" or a confidentiality mark.

In step S204, in a case where a determination that the personal information or the concealment information is included in the original document image is made, the control unit 35 registers the parameters in the execution of the job as the personal job history information of the user in step S208 and finishes the process.

Figure 14:
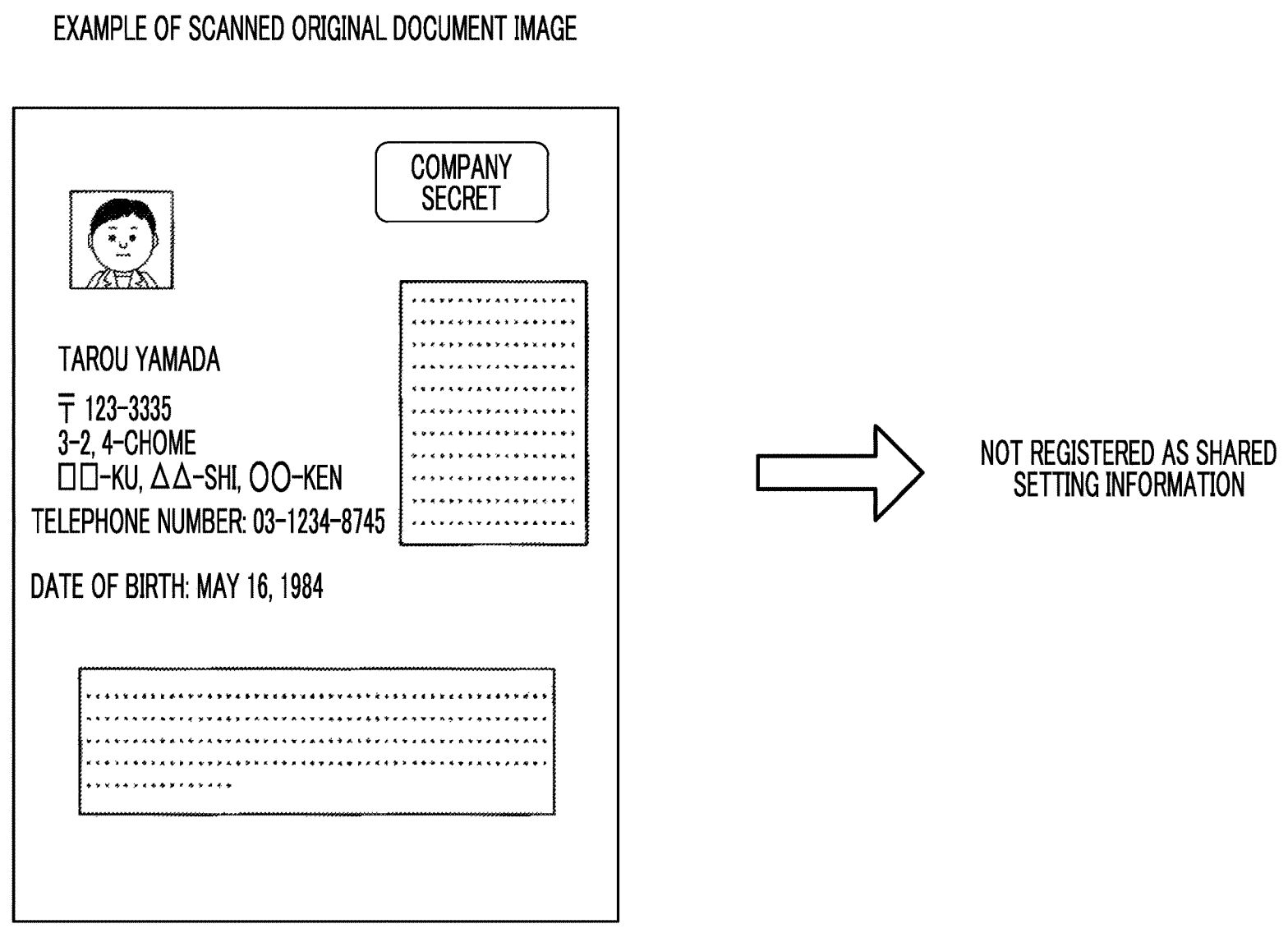

For example, an image example as illustrated in FIG. 14 will be described as the scanned original document image. In the original document image example illustrated in FIG. 14, the personal information such as the face photo image, the name, the address, the telephone number, and the date of birth is included, and the text string "company secret" is included. Thus, in a case where the scanned original document image is the image as illustrated in FIG. 14, the control unit 35 determines that the personal information or the concealment information is included in the scanned original document image. The control unit 35 determines that the job in which such an original document image is used is not to be registered as the shared setting information, registers the job as the personal job history information, and finishes the process.

In step S204, in a case where a determination that the personal information or the concealment information is not included in the original document image is made, the control unit 35 determines whether or not the destination information is included in the whitelist in step S205.

An example of the whitelist is illustrated in FIG. 15. The whitelist example illustrated in FIG. 15 represents a list table of FAX numbers of each department of a certain company. That is, in a case where registering the job as the shared setting information does not pose a problem as long as the job is FAX transmission to another department within the company, registering a job of transmitting the image outside the company by FAX as the shared setting information can be prevented by setting a condition that the destination information in the job of FAX transmission is included in the whitelist.

In step S205, in a case where a determination that the destination information is not included in the whitelist is made, the control unit 35 registers the parameters in the execution of the job as the personal job history information of the user in step S208 and finishes the process.

In step S205, in a case where a determination that the destination information is included in the whitelist is made, the control unit 35 determines whether or not a parameter that cannot be used by other users is included in the parameters of the executed job in step S206. Here, for example, the parameter that cannot be used by other users means a parameter that cannot be used by only a specific person, such as a parameter for storing an image in a storage region of a person for which a password is necessary.

In step S206, in a case where a determination that the parameter that cannot be used by other users is included in the parameters of the executed job is made, the control unit 35 registers the parameters in the execution of the job as the personal job history information of the user in step S208 and finishes the process.

In step S206, in a case where a determination that the parameter that cannot be used by other users is not included in the parameters of the executed job is made, the control unit 35 registers the parameters in the execution of the job, that is, the setting values, as the shared setting information in step S207.

In the flowchart illustrated in FIG. 13, the process of steps S204 to S206 corresponds to the process of step S102 in the flowchart illustrated in FIG. 12, that is, the determination process as to whether or not the preset condition is satisfied.

In the flowchart illustrated in FIG. 13, while the parameters of the executed job are registered as the shared setting information in a case where all conditions in steps S204 to S206 are satisfied, the parameters of the executed job can also be set to be registered as the shared setting information in a case where only anyone condition is satisfied. In addition, the manager user can set, in advance, which condition is to be satisfied for registering the parameters of the executed job as the shared setting information.

Figure 16:
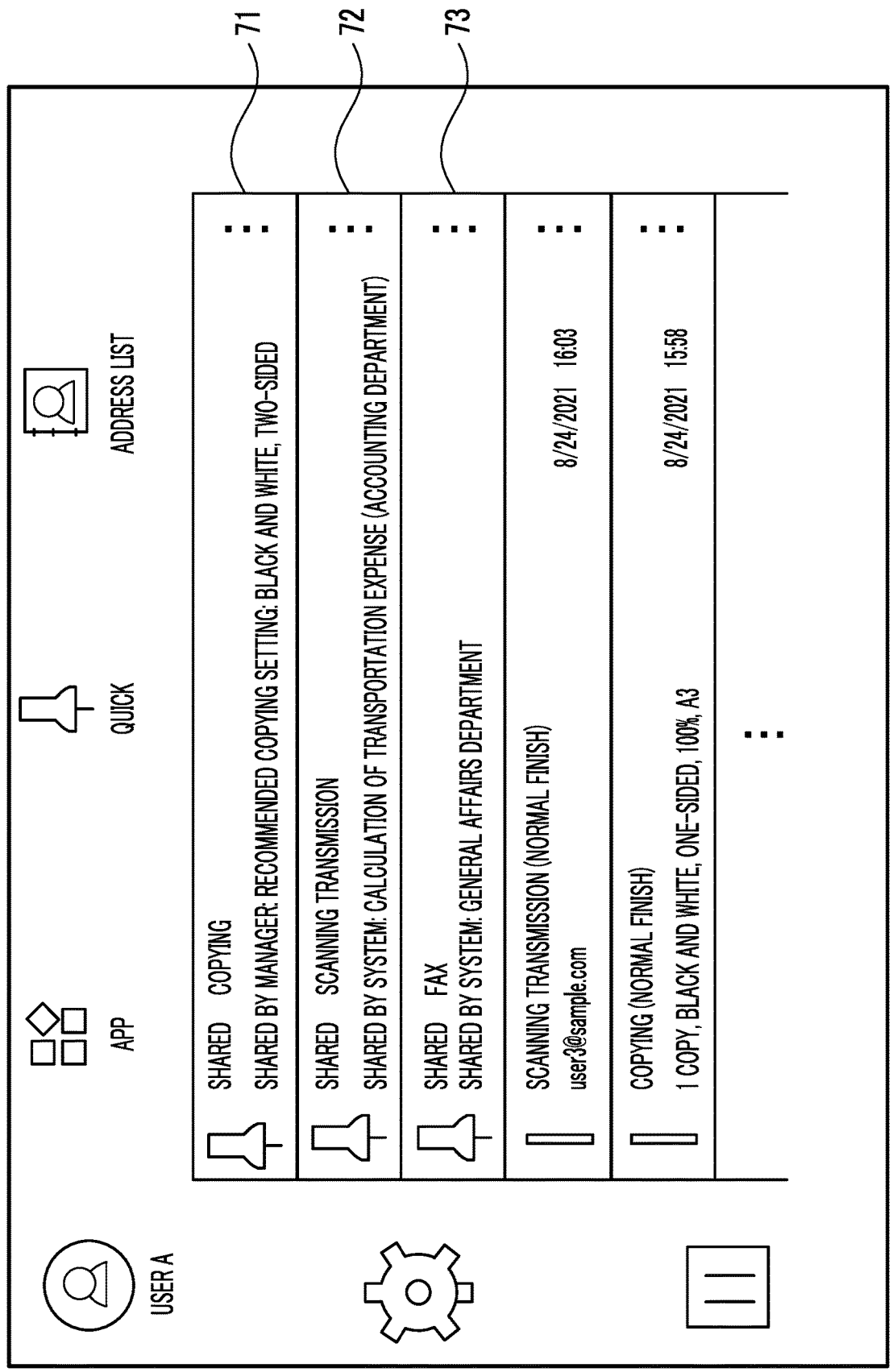
FIG. 16 is a diagram illustrating a display screen example after the shared setting information is registered.
Figure 17:
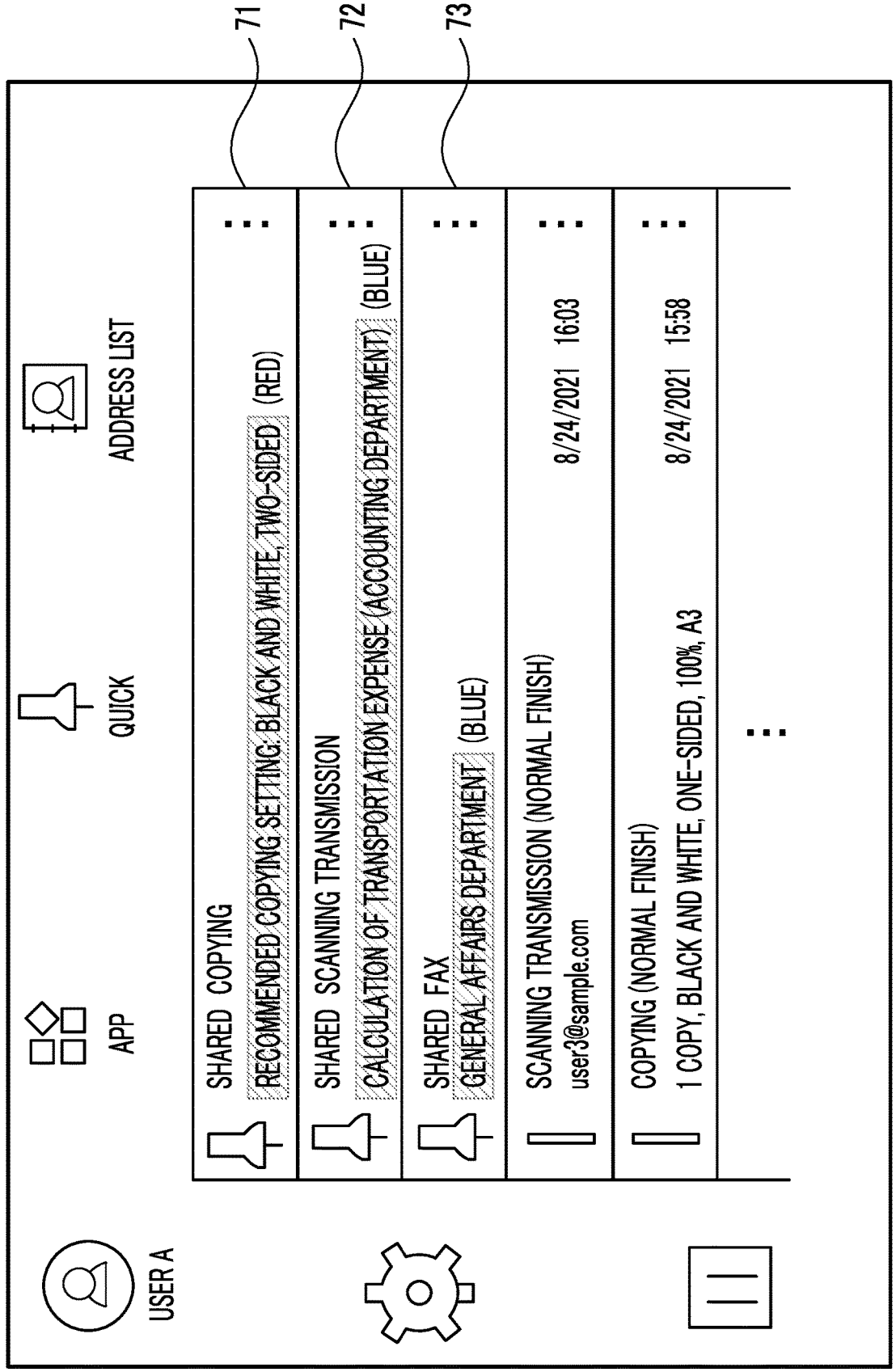
FIG. 17 is a diagram illustrating a display screen example after the shared setting information is registered.

Next, a display screen example after the shared setting information is registered is illustrated in FIG. 16 to FIG. 18.

In FIG. 16 to FIG. 18, a display screen example in which three pieces of shared setting information 71 to 73 are registered is illustrated. In these display screen examples, the shared setting information 71 is registered by the operation of the manager user, and the shared setting information 72 and 73 is automatically registered by the above process independently of the operation of the manager user.

In any of the display screen examples in FIG. 16 to FIG. 18, the shared setting information registered by the manager user and the shared setting information automatically registered in a case where the executed processing content satisfies the preset condition are displayed in a distinguishable manner.

Specifically, in the display screen example illustrated in FIG. 16, the distinction can be made by including a text string "shared by manager" in the name of the shared setting information 71 and including a text string "shared by system" in the names of the shared setting information 72 and 73.

In addition, in the display screen example illustrated in FIG. 17, the distinction can be made by setting a display color of the name of the shared setting information 71 to red and setting display colors of the names of the shared setting information 72 and 73 to blue.

Furthermore, in the display screen example illustrated in FIG. 18, the distinction can be made by displaying an icon 80 indicating registration by the manager user in a display region of the shared setting information 71 and displaying an icon 81 indicating automatic registration by the system in display regions of the shared setting information 72 and 73.

In any of the display screen examples in FIG. 16 to FIG. 18, by displaying the shared setting information 71 registered by the manager user, the shared setting information 72 and 73 automatically registered by the system, and the personal job history information in this order, the user can also recognize whether or not the shared setting information is registered by the operation of the manager user based on an arrangement order of the setting information.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Modification Example

While the exemplary embodiment is described using a case where the present invention is applied to an image forming apparatus forming an image on a recording medium, the present invention is not limited thereto. The present invention can also be applied to an information processing apparatus such as a personal computer or a portable terminal apparatus that stores setting information in which a setting value is stored for each setting item, and that executes a process using the stored setting information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
in a case where an executed processing content satisfies a preset condition, register setting information in which a setting value in the processing content is stored for each setting item, as shared setting information usable by a plurality of users without generating history information generated in a case where a process is executed,
in a case where the executed processing content does not satisfy the preset condition, generate the history information, and register the shared setting information by selection from the history information by a manager user who manages the apparatus.

2. The information processing apparatus according to claim 1,
wherein the preset condition is that confidential information is not included in image data to be processed.

3. The information processing apparatus according to claim 2,
wherein not including the confidential information is not including personal information from which a person is specifiable in the image data to be processed.

4. The information processing apparatus according to claim 2,
wherein not including the confidential information is not including text information indicating that the confidential information is included in the image data to be processed.

5. The information processing apparatus according to claim 1,
wherein the preset condition is a preset processing condition.

6. The information processing apparatus according to claim 5,
wherein the preset processing condition is that destination information of a personal attribute or storage location information of a personal attribute is not included in the executed processing content.

7. The information processing apparatus according to claim 5,
wherein the preset processing condition is that destination information of a personal attribute or storage location information of a personal attribute in the executed processing content is included in a preregistered destination list or storage location list.

8. The information processing apparatus according to claim 1, wherein the processor is configured to:
display the shared setting information registered by the manager user in a distinguished manner from the shared setting information registered in a case where the executed processing content satisfies the preset condition.

9. The information processing apparatus according to claim 8, wherein the processor is configured to:
display the shared setting information registered by the manager user and the shared setting information registered in a case where the executed processing content satisfies the preset condition in a distinguished manner using colors.

10. The information processing apparatus according to claim 8, wherein the processor is configured to:
perform the distinguished display by adding a specific text to a name of at least any of the shared setting information registered by the manager user or the shared setting information registered in a case where the executed processing content satisfies the preset condition.

11. The information processing apparatus according to claim 1, wherein the processor is configured to:
collectively display each of the shared setting information registered by the manager user, the shared setting information registered in a case where the executed processing content satisfies the preset condition, and personal setting information registered by a general user in this order.

12. The information processing apparatus according to claim 1,
wherein the preset condition is that a preset type of process is performed.

13. The information processing apparatus according to claim 1,
wherein the preset condition is that a process is performed by a preset user.

14. A non-transitory computer readable medium storing a program causing a computer to execute a process comprising:
registering, in a case where an executed processing content satisfies a preset condition, setting information in which a setting value in the processing content is stored for each setting item, as shared setting information usable by a plurality of users without generating history information generated in a case where a process is executed,
in a case where the executed processing content does not satisfy the preset condition, generating the history information, and
registering the shared setting information by selection from the history information by a manager user who manages the apparatus.

15. An information processing method comprising:
registering, in a case where an executed processing content satisfies a preset condition, setting information in which a setting value in the processing content is stored for each setting item, as shared setting information usable by a plurality of users without generating history information generated in a case where a process is executed,
in a case where the executed processing content does not satisfy the preset condition, generating the history information, and
registering the shared setting information by selection from the history information by a manager user who manages the apparatus.

* * * * *